(12) United States Patent
Fazio et al.

(10) Patent No.: US 11,053,158 B2
(45) Date of Patent: Jul. 6, 2021

(54) CHOPPER ASSEMBLY AND METHOD FOR MANUFACTURING CHOPPED FIBERS

(71) Applicant: Owens Corning Intellectual Capital, LLC, Toledo, OH (US)

(72) Inventors: Michael B. Fazio, Newark, OH (US); David D. Melick, Centerburg, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 16/066,446

(22) PCT Filed: Jan. 10, 2017

(86) PCT No.: PCT/US2017/012789
§ 371 (c)(1),
(2) Date: Jun. 27, 2018

(87) PCT Pub. No.: WO2017/127254
PCT Pub. Date: Jul. 27, 2017

(65) Prior Publication Data
US 2019/0002334 A1    Jan. 3, 2019

Related U.S. Application Data

(60) Provisional application No. 62/280,279, filed on Jan. 19, 2016.

(51) Int. Cl.
*C03B 37/16* (2006.01)
*B26D 1/40* (2006.01)
(Continued)

(52) U.S. Cl.
CPC ............. *C03B 37/16* (2013.01); *B26D 1/405* (2013.01); *B26D 7/204* (2013.01); *D01G 1/04* (2013.01);
(Continued)

(58) Field of Classification Search
CPC .......... B26D 7/204; B26D 1/40; B26D 1/405; C03B 1/04; D01G 1/04; Y10T 83/4841; Y10S 83/913
(Continued)

(56) References Cited

U.S. PATENT DOCUMENTS 700,509 A  *  5/1902  Knauber et al. ....... A63C 17/22
                                                   301/5.307
954,048 A  *  4/1910  Price ........................ B60B 3/08
                                                   301/64.303
(Continued)

FOREIGN PATENT DOCUMENTS

EP    1808515 A1    7/2007
FR    2917661 B1    1/2010

OTHER PUBLICATIONS

Office Action from U.S. Appl. No. 15/780,674 dated Jul. 16, 2019.
(Continued)

*Primary Examiner* — Clark F Dexter
(74) *Attorney, Agent, or Firm* — Calfee, Halter & Griswold LLP (57) ABSTRACT

An assembly for chopping glass fibers including a cutter wheel having a plurality of radially extending blades and a cot wheel adjacent the cutter wheel. The cot wheel including an inner hub, an elastomeric ring mounted onto the inner hub for rotation therewith; and a retaining device fixably attached to the hub and engaging the elastomeric ring to resist separation of the elastomeric ring from the hub during rotation of the cot wheel.

10 Claims, 6 Drawing Sheets

(51) Int. Cl.
*D01G 1/04* (2006.01)
*B26D 7/20* (2006.01)

(52) U.S. Cl.
CPC ......... *D10B 2101/06* (2013.01); *Y10S 83/913* (2013.01); *Y10T 83/4841* (2015.04)

(58) Field of Classification Search
USPC .................................................. 83/347, 913
See application file for complete search history.

(56) References Cited

U.S. PATENT DOCUMENTS

| | | | | |
|---|---|---|---|---|
| 960,212 | A | * | 5/1910 | Wiechard ................ B60B 21/10 |
| | | | | 152/375 |
| 1,312,124 | A | * | 8/1919 | Killen ...................... B60C 7/12 |
| | | | | 152/325 |
| 1,328,779 | A | * | 1/1920 | Barker ..................... B60C 7/26 |
| | | | | 152/46 |
| 1,415,486 | A | * | 5/1922 | Schultz .................... B60B 9/10 |
| | | | | 152/44 |
| 1,491,537 | A | * | 4/1924 | Killen ...................... B60C 7/00 |
| | | | | 152/325 |
| 2,271,166 | A | * | 1/1942 | Weiss ..................... B65G 39/04 |
| | | | | 198/843 |
| 3,644,109 | A | | 2/1972 | Klink et al. |
| 3,869,268 | A | | 3/1975 | Briar et al. |
| 4,037,299 | A | * | 7/1977 | Smith ...................... D01H 5/80 |
| | | | | 492/56 |
| 4,045,196 | A | | 8/1977 | Schaefer |
| 4,073,208 | A | | 2/1978 | Kirkpatrick |
| 4,083,279 | A | | 4/1978 | Wester et al. |
| 4,194,896 | A | | 3/1980 | Symborski et al. |
| 4,406,196 | A | | 9/1983 | Roncato et al. |
| 4,411,180 | A | | 10/1983 | Roncato |
| 4,982,639 | A | | 1/1991 | Kirkpatrick |
| 5,733,015 | A | * | 3/1998 | Demarest et al. ..... A63C 17/24 |
| | | | | 152/312 |
| 5,894,773 | A | | 4/1999 | Sevenish et al. |
| 6,202,525 | B1 | | 3/2001 | Hendrickson et al. |
| 6,415,997 | B1 | | 7/2002 | Font et al. |
| 6,431,235 | B1 | * | 8/2002 | Steinke ................... B60B 1/003 |
| | | | | 152/310 |
| 6,889,587 | B2 | | 5/2005 | Neal |
| 7,070,551 | B2 | | 7/2006 | Lasson |
| 2006/0037452 | A1 | * | 2/2006 | Grenier et al. ........ B26D 1/405 |
| | | | | 83/469 |
| 2006/0185541 | A1 | | 8/2006 | Czeranka et al. |
| 2007/0006696 | A1 | | 1/2007 | Kempski et al. |
| 2008/0210066 | A1 | | 9/2008 | Arterburn et al. |
| 2008/0210071 | A1 | * | 9/2008 | Font et al. ............... D01G 1/04 |
| | | | | 83/347 |
| 2010/0183759 | A1 | | 7/2010 | Allis |
| 2012/0227559 | A1 | * | 9/2012 | Rohrer .................. B05B 7/0408 |
| | | | | 83/347 |

OTHER PUBLICATIONS

International Search Report and Written Opinion from PCT/US2016/063238 dated Feb. 23, 2017.
International Search Report and Written Opinion from PCT/US2017/012789 dated Apr. 5, 2017.
Office Action from U.S. Appl. No. 15/780,674 dated Nov. 22, 2019.
Office Action from U.S. Appl. No. 15/780,674 dated Mar. 24, 2020.
Office Action from Chinese Application No. 201780007222.8 dated Dec. 18, 2020.

\* cited by examiner

Fig. 12

CHOPPER ASSEMBLY AND METHOD FOR MANUFACTURING CHOPPED FIBERS

CROSS REFERENCE TO RELATED APPLICATIONS

This application is the U.S. national stage entry of PCT/US2017/012789, filed on Jan. 10, 2017, which claims priority to and any benefit of U.S. Provisional Application No. 62/280,279, filed Jan. 19, 2016, the entire contents of which are incorporated herein by reference.

FIELD

The inventive concepts relate generally to an assembly for and a method of manufacturing chopped fibers, and, more particularly, to an assembly for and method of manufacturing chopped fibers that includes a retaining device that resists the separation of a hub mounted elastomeric ring from the hub at high speeds.

BACKGROUND

Glass fibers are used in a wide variety of applications. For example, discrete segments of glass fiber strands, or "chopped strand," can be randomly laid across each other and held together by a binder to form a chopped strand mat that can be used as a reinforcing material in many applications. Chopped strand is typically manufactured by using a chopping assembly including a chopper wheel or roller that contains a plurality of blades that contact a drive or driven wheel or roller having a hard, elastomeric exterior surface that the blades contact. Continuous glass fibers that are drawn between the wheels are cut to form the chopped strand.

SUMMARY

The general inventive concepts contemplate an assembly for and a method of manufacturing chopped fibers.

In one exemplary embodiment, an assembly for chopping glass fibers may include a cutter wheel having a plurality of radially extending blades and a cot wheel adjacent the cutter wheel. The cot wheel includes an inner hub, an elastomeric ring mounted onto the inner hub for rotation therewith, and a retaining device fixably attached to the hub and engaging the elastomeric ring to resist separation of the elastomeric ring from the hub during rotation of the cot wheel.

Other aspects, advantages, and features of the general inventive concepts will become apparent to those skilled in the art from the following detailed description, when read in light of the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

Figures 1, 2:
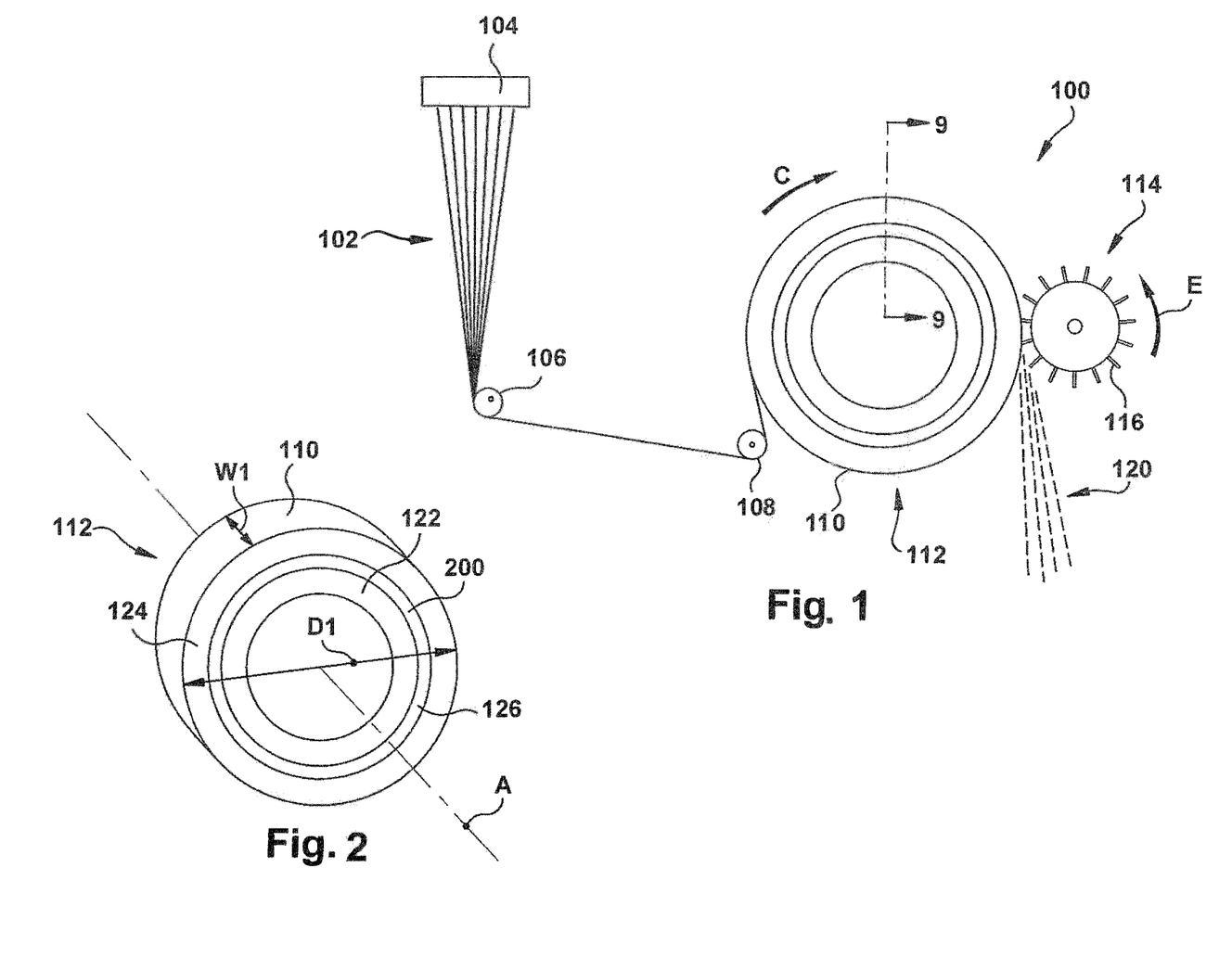
FIG. 1 is a schematic representation of an assembly for manufacturing chopped fibers.
FIG. 2 is a perspective view of the cot wheel of the assembly of FIG. 1.

Referring now to the drawings, FIG. 1 is a partial schematic illustration of an exemplary embodiment of an assembly 100 for manufacturing discrete segments of glass fiber, or "chopped strand." The assembly 100 may be configured in a variety of ways. For example, the assembly 100 may include various components, such as one or more glass fiber feeders, sizing application systems, various guides, pulleys, and rollers, which may be oriented in any suitable manner. For example, the components may be oriented in a manner that is know in the art, such as for example, as is set forth in U.S. Pat. Nos. 4,194,896, 4,411,180, and 6,415,997, each of which are incorporated herein by reference in their entirety.

In the illustrated embodiment, a plurality of continuous glass fibers 102 are drawn from one or more feeders 104 around a guide roll 106 and an idler roll 108. FIG. 1 illustrates a single feeder 104, but any number of feeders may be incorporated in the assembly 100. The guide roll 106 and the idler roll 108 are configured and positioned to arrange the fibers 102 in a generally planar orientation and bring the fibers 102 into engagement with a circumferential surface 110 of a first rotatable member or cot wheel 112.

As illustrated in FIG. 1, the cot wheel 112 is driven in a clockwise direction, as shown by arrow C, which pulls the fibers around the circumferential surface 110 of the cot wheel 112 to a position in which a second rotatable member or cutter wheel 114 is in contact with the cot wheel 112. As illustrated, the cutter wheel 114 rotates in a counterclockwise direction as shown by the arrow E. The cutter wheel 114 includes a plurality of radially extending blades 116 which contact the circumferential surface 110 of the cot wheel 112 to cut the fibers 102 into discrete segments 120.

Referring to FIG. 2, the cot wheel 112 may be configured in a variety of ways. In the exemplary embodiment, the cot wheel 112 has a width W1, a diameter D1, and includes an inner hub 122, an outer elastomeric ring 124 mounted onto the inner hub for rotation therewith along a central longitudinal axis A, and a retaining device 126 for resisting separation of the elastomeric ring from the hub at high speeds.

Figure 3:
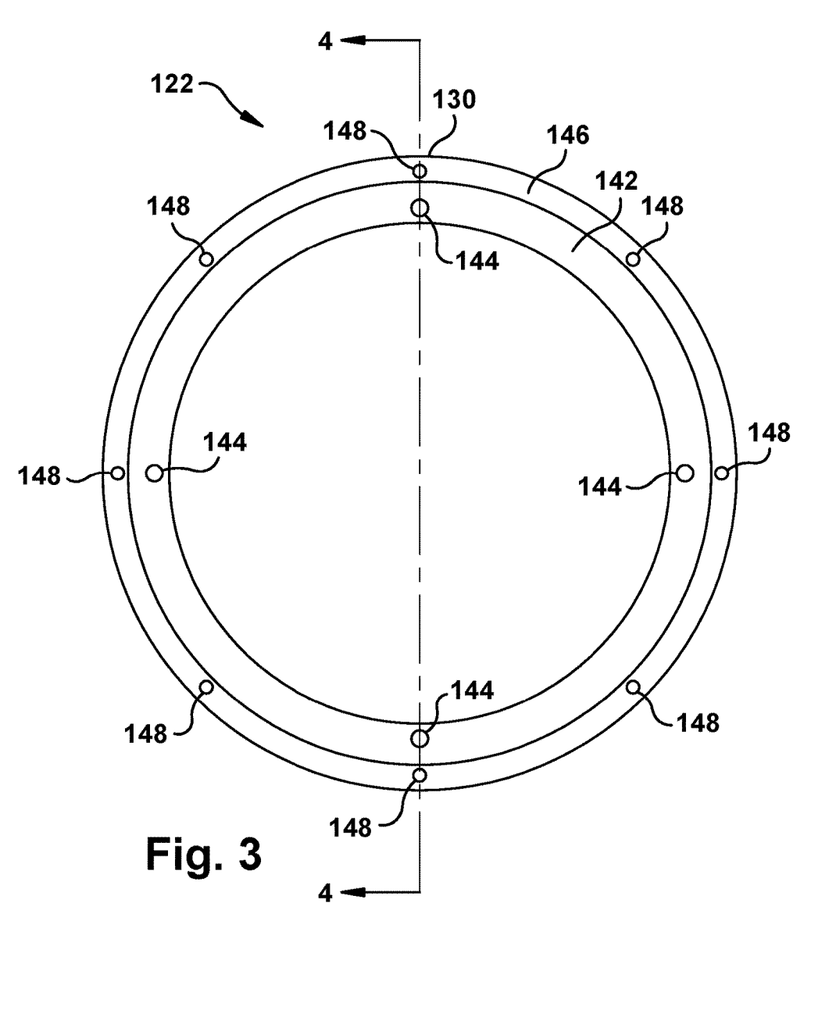
FIG. 3 is a front view of an exemplary embodiment of an inner hub of the assembly of FIG. 1.
Figure 4:
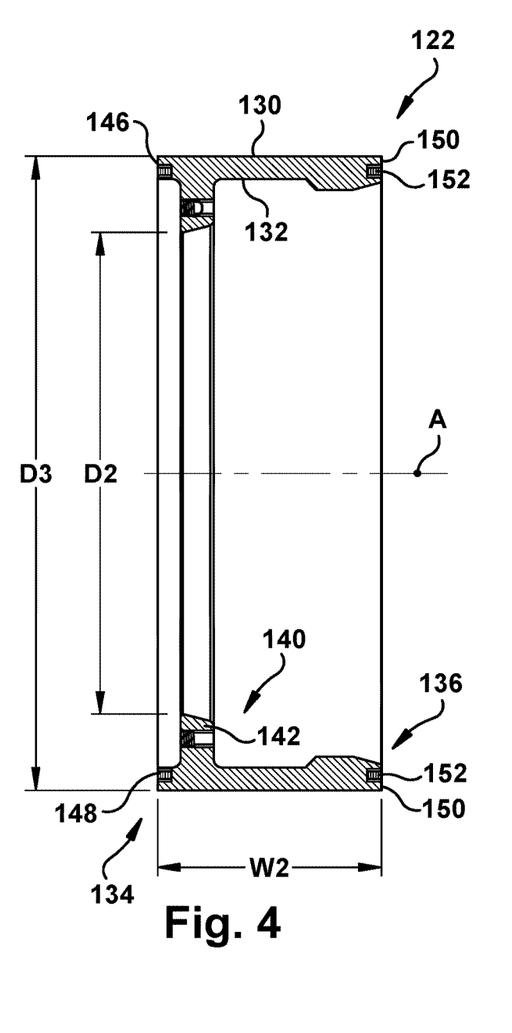
FIG. 4 is a cross-section view of the inner hub of FIG. 4 along line 4-4.

Referring to FIGS. 3-4, the inner hub 122 may be configured in a variety of ways. In the illustrated embodiment, the inner hub 122 is an annular member made from any suitable material. In one exemplary embodiment, the inner hub 122 is formed from a lightweight metal, such as for example, aluminum. The inner hub 122 has an inner diameter D2, an outer diameter D3, a width W2, an outer circumferential surface 130, and an inner circumferential surface 132 generally parallel to the outer circumferential surface. In some embodiments, the hub outer diameter D3 is in the range of about 400 mm to about 700 mm. In other embodiments, however, the hub outer diameter D3 may be less than 400 mm or greater than 700 mm.

The inner hub 122 has a first end 134 and a second end 136 opposite the first end. The inner hub 122 includes a mounting surface 140 adjacent the first end 134 to facilitate mounting the inner hub 122 to a drive member (not shown), such as for example, a drive shaft, for rotation about the central longitudinal axis A. The mounting surface 140 may be configured in a variety of ways. In the illustrated embodiment, the mounting surface 140 includes an annular ridge 142 extending inward from the inner surface 132 of the inner hub 122. In the exemplary embodiment, the ridge 142 includes a plurality of threaded fastener bores 144 for receiving fasteners for attaching the drive member (not shown) to the inner hub 122. In other embodiments, however, the inner hub 122 may mount to the drive member (not shown) in any suitable manner. In the illustrated embodiment, the ridge 142 includes four fastener bores 144. In other embodiments, however, the ridge 142 may include more or less than four fastener bores 144.

The first end 134 of the inner hub 122 includes a first annular face 146. In the illustrated embodiment, the first annular face 146 is generally perpendicular to the outer circumferential surface 130. The first annular face 146 includes a plurality of fastener bores 148 for receiving fasteners for attaching the retaining device 126 to the inner hub 122. In other embodiments, however, the retaining device 126 may mount to the inner hub 122 in any suitable manner. In the illustrated embodiment, first annular face 146 includes eight fastener bores 148. In other embodiments, however, the first annular face 146 may include more or less than eight fastener bores 148.

The second end 136 of the inner hub 122 includes a second annular face 150. In the illustrated embodiment, the second annular face 150 is generally perpendicular to the outer circumferential surface 130. The second annular face 150 includes a plurality of fastener bores 152 for receiving fasteners for attaching the retaining device 126 to the inner hub 122. In other embodiments, however, the retaining device 126 may mount to the inner hub 122 in any suitable manner. In the illustrated embodiment, the second annular face 150 includes eight fastener bores 152. In other embodiments, however, the second annular face 150 may include more or less than eight fastener bores 152.

Figure 5:
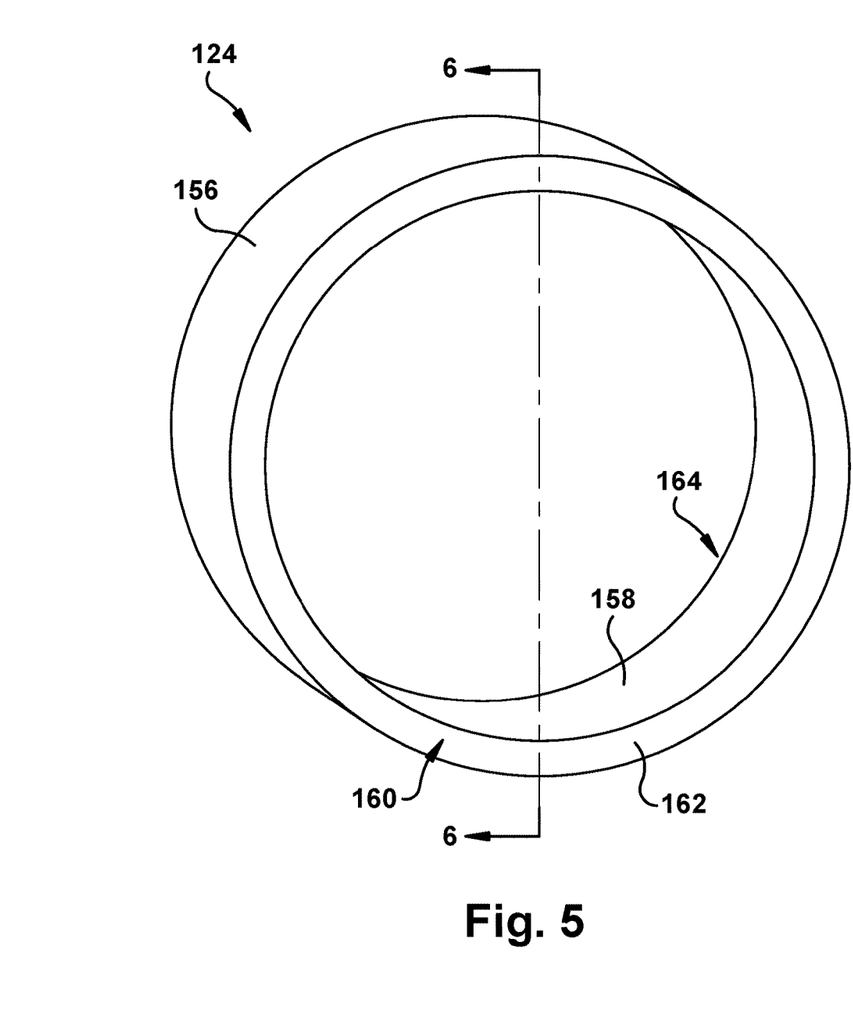
FIG. 5 is a perspective view of an exemplary embodiment of an elastomeric ring of the assembly of FIG. 1.
Figure 6:
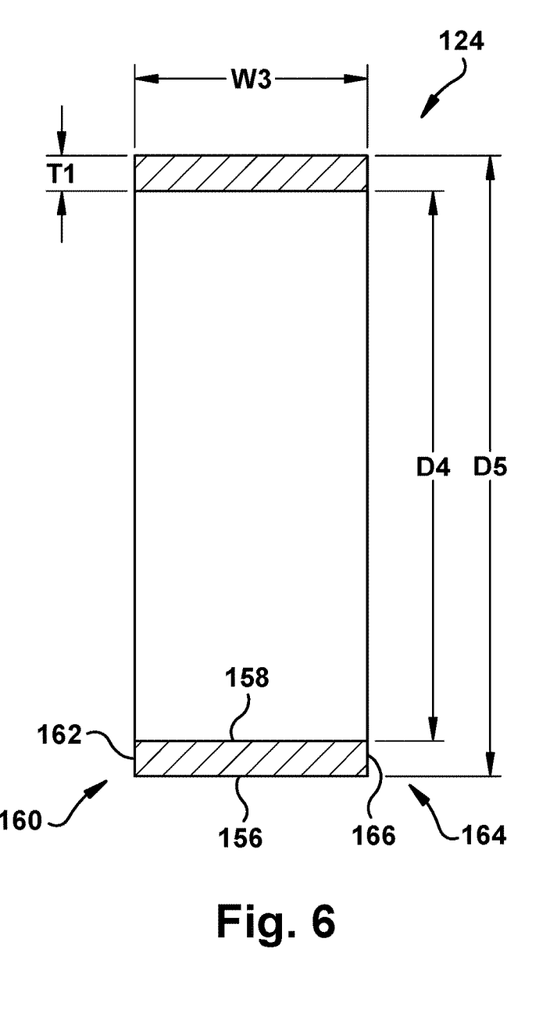
FIG. 6 is a cross-section view of the elastomeric ring of FIG. 5 along line 6-6.

Referring to FIGS. 5-6, the elastomeric ring 124 may be configured in a variety of ways. For example, the elastomeric material(s) used, the number of different elastomeric materials used, and the thickness of the ring, may vary in different embodiments. Any configuration that allows the elastomeric ring 124 to mount onto the inner hub 122 for rotation therewith and define the outer circumferential surface 110 of the cot wheel 112 may be used. In the illustrated embodiment, the elastomeric ring 124 has an inner diameter D4, an outer diameter D5 which defines the cot wheel diameter D1, a width W3, an outer circumferential surface 156 which defines the circumferential surface 110 of the cot wheel 112, and an inner surface 158 generally parallel to the outer circumferential surface 156. The elastomeric ring 124 has a first end 160 with a first annular face 162 and a second end 164 with a second annular face 166 opposite and generally parallel to the first annular face 162.

The elastomeric ring 124 may be made of any suitable elastomeric material or materials. Suitable elastomeric materials include, but are not limited to rubber and polyurethane. A polyurethane, if used, may be made from any suitable diisocyanates (e.g., methylene diphenyl diisocyanate (MDI), toluene diisocyanate (TDI), 1,5-naphthalene diisocyanate (NDI)) and polyols (e.g., polyester, polyether).

The elastomeric ring 124 may be mounted onto the inner hub 122 by any suitable manner. In the exemplary embodiment, the elastomeric ring 124 is pressed onto the inner hub 122. The inner diameter D4 of the elastomeric ring 124 is slightly smaller than the outer diameter D3 of the inner hub 122. When pressed onto the inner hub 122, the elastomeric ring 124 stretches to allow the outer diameter D3 of the inner hub 122 to fit within the inner diameter D4 of the elastomeric ring 124. Thus, when pressed onto the inner hub 122, the elastomeric ring 124 exerts a clamping force onto the hub forming a press or interference fit which attaches the elastomeric ring 124 to the inner hub 122. The clamping forces between the elastomeric ring 124 and the inner hub 122 are sufficient to hold the elastomeric ring 124 fixed to the inner hub 122 but also allow the elastomeric ring to be removed/replaced without the need to overcome a chemical bond.

The retaining device 126 is configured to maintain a positive clamping force between the elastomeric ring 124 and the inner hub 122 at high rotational speeds of the cot wheel 112 where centrifugal forces act against the clamping force. The retaining device 126 may be configured in a variety of ways. Any configuration capable of maintaining a positive clamping force between the elastomeric ring 124 and the inner hub 122 at high rotational speeds, or of resisting centrifugal forces overcoming the clamping force of the elastomeric ring 124 on the inner hub 122, may be used. For example, the retaining device 126 may be configured to mechanically hold the elastomeric ring 124 in place relative to the inner hub 122 during rotation of the cot wheel 112.

Figure 9:
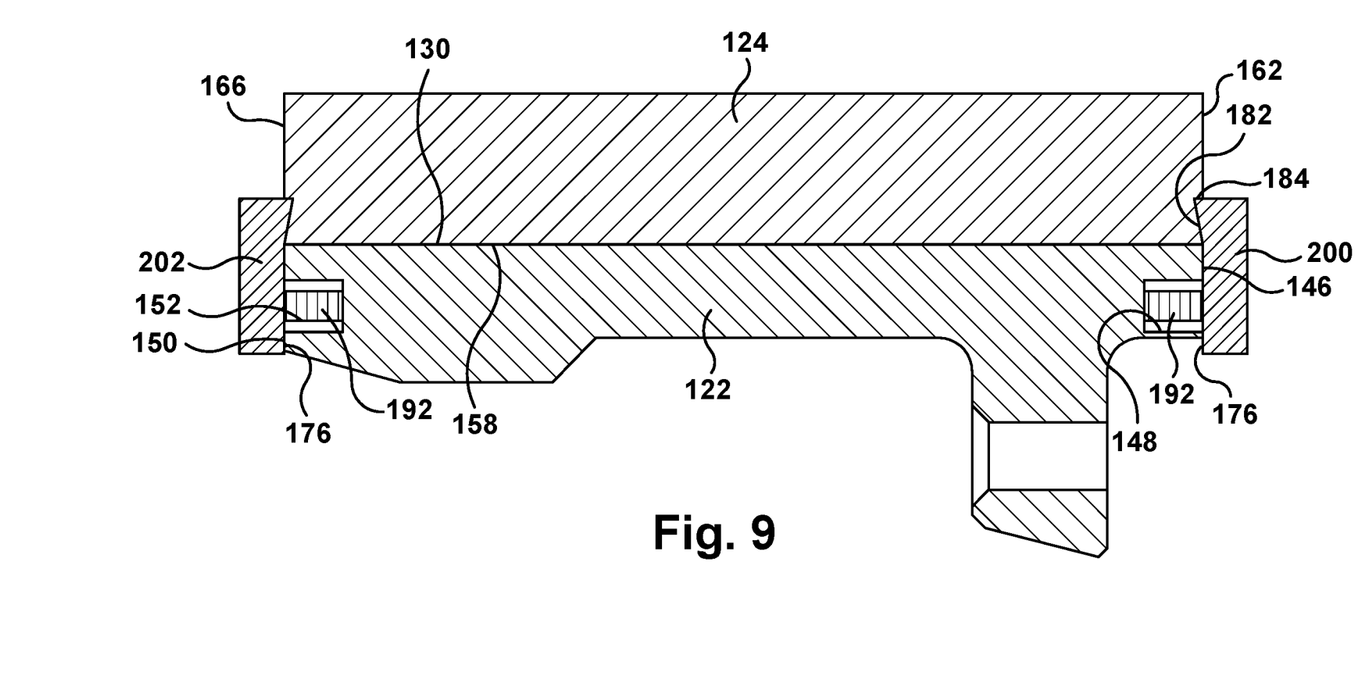
FIG. 9 is a partial cross-section view of the assembly of FIG. 1 along line 9-9.

In the exemplary embodiment, the retaining device 126 includes a first retaining member 200 and a second retaining member 202 (see FIG. 9). In the exemplary embodiment, the first retaining member 200 and the second retaining member 202 are ring shaped and substantially similar. In other embodiments, however, the first and second retaining members 200, 202 may be other than ring-shaped and may be configured differently than each other. The first and second retaining members 200, 202 may be made of any suitable materials, such as for example, steel, aluminum, plastic, or other suitable material.

Figure 7:
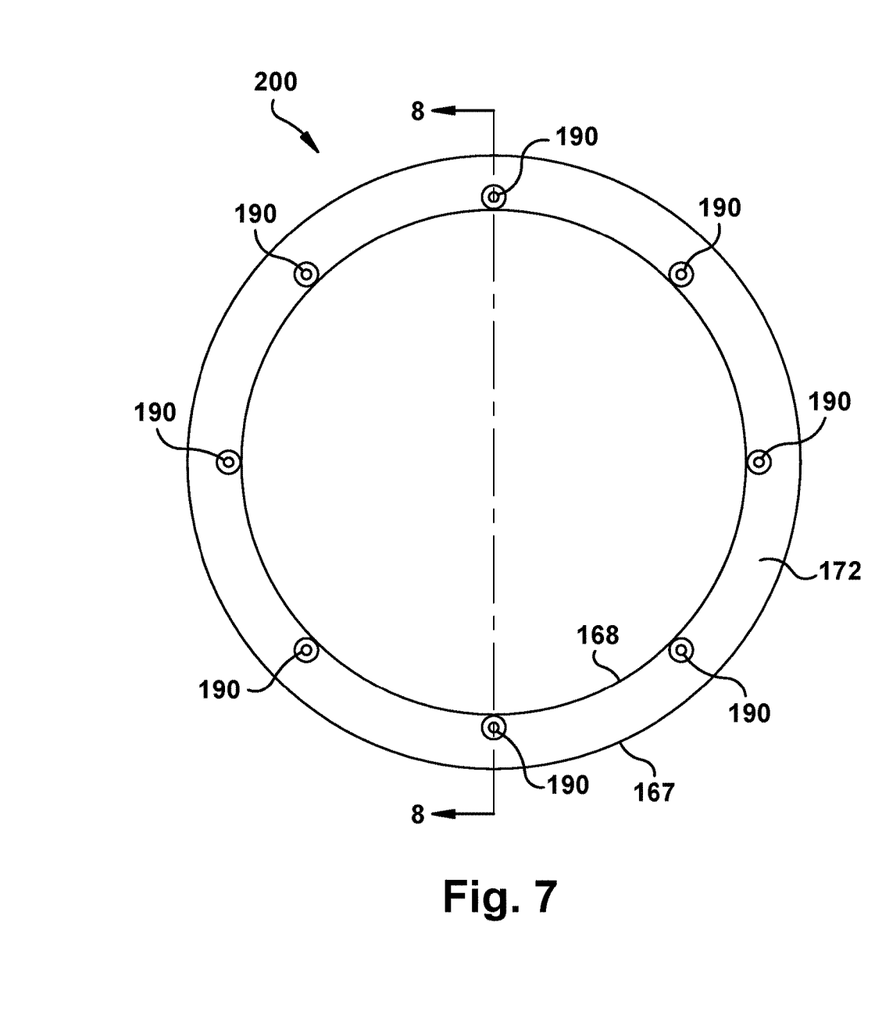
FIG. 7 is a front view of an exemplary embodiment of a retaining member of the assembly of FIG. 1.
Figure 8:
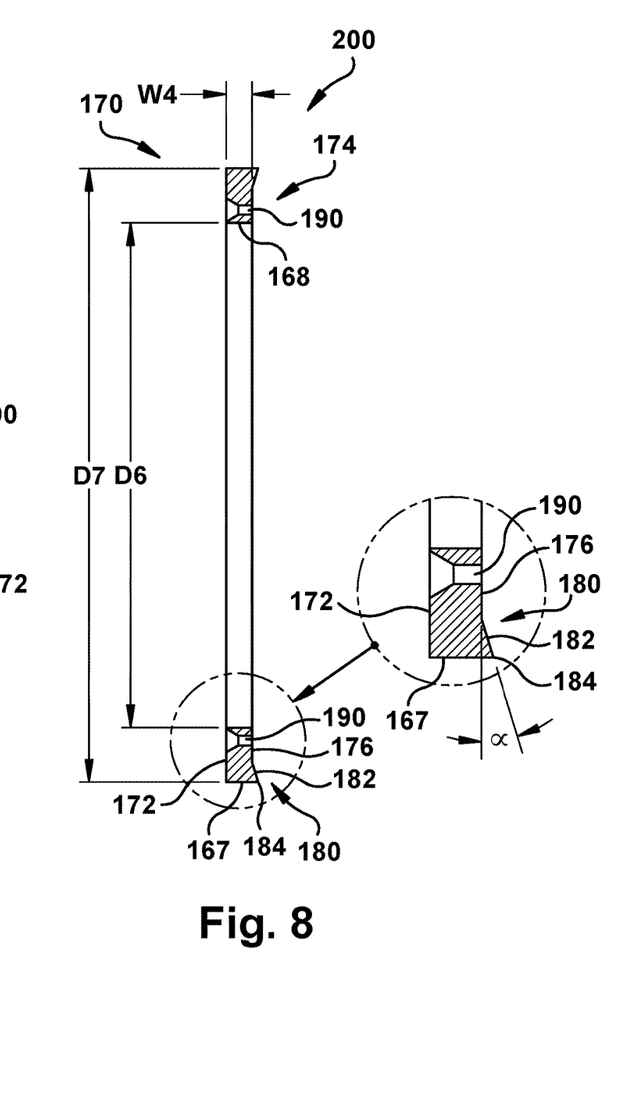
FIG. 8 is a cross-section view of the retaining member of FIG. 7 along line 8-8.

FIGS. 7-8 illustrate the first retaining member 200. In the exemplary embodiment, the description of the first retaining member 200 applies equally to the second retaining member 202. The first retaining member 200 has an inner diameter D6, an outer diameter D7, a width W4, an outer circumferential surface 167, and an inner surface 168 generally parallel to the outer circumferential surface 166. The first retaining member 200 has a first end 170 with a first annular face 172 and a second end 174 with a second annular face 176 opposite and generally parallel to the first annular face 172.

The second annular face 176 of the first retaining member 200 includes retaining structure 180 for engaging the first annular face 162 of the elastomeric ring 124. The retaining structure 180 may be configured in a variety of ways. Any structure that engages with the elastomeric ring 124 to resist movement of the elastomeric ring relative to the inner hub 122 may be used. For example, the retaining structure 180 may be one or more projections that indent or project into the first annular face 162 of the elastomeric ring 124. The retaining structure 180 may extend continuously around the second annular face 176 or may be discontinuous. In some embodiments, the elastomeric ring 124 may include a corresponding recess or hole for receiving the one or more projections. In other embodiments, however, the elastomeric ring 124 does not include a recess or hole for receiving the one or more projections. Instead, the one or more projections indent into the first annular face. In some embodiments, the elastomeric ring 124 may include one or more projections that are received in one or more recesses or holes in the retaining members 200, 202.

In the illustrated embodiment, first retaining member 200 includes a tapered surface 182 projecting outward from the second annular face 176 such that a projection 184 is formed at the intersection between the second annular face 176 and the outer circumferential surface 167 of the first retaining member 200. The tapered surface 182 extends at an angle α from the second annular face 176. In one embodiment, the angle α is in the range of 5 degrees to 20 degrees. In one embodiment, the angle α is 10 degrees, or about 10 degrees. In other embodiments, the angle α may be greater than 20 degrees and less than 5 degrees.

The first retaining member 200 includes one or more features that facilitate mounting the first retaining member onto the inner hub 122. The first retaining member 200 may mount onto the inner hub 122 in any suitable manner. In the illustrated embodiment, the first retaining member 200 includes a plurality of mounting holes 190 for receiving fasteners 192 (FIG. 9), such as for example bolts, for mounting the first retaining member 200 to the inner hub 122. In the illustrated embodiment, the first retaining member 200 has eight mounting holes 190. In other embodiments, however, the first retaining member 200 may have more or less than eight mounting holes 190. The mounting holes 190 on the first retaining member 200 are arranged to align with the fastener bores 148, 152 on the inner hub 122.

Referring to FIG. 9, when assembled, the elastomeric ring 124 is pressed onto the inner hub 122 such that the inner surface 158 of the elastomeric ring 124 clamps against the outer circumferential surface 130 of the inner hub 122. The first retaining member 200 is fastened onto the inner hub 122 via fasteners 192 received through the mounting holes 190 (FIG. 7) and into the fastener bores 148 such that the second annular face 176 of the first retaining member 200 is tightened against the first annular face 146 of the inner hub 122. In a similar manner, the second retaining member 202 is fastened to the second annular face 150 of the inner hub 122 such that the elastomeric ring 124 is sandwiched between the first and second retaining members 200, 202.

In the exemplary embodiment, the outer diameter D7 of the first retaining member 200 is greater than the inner diameter D4 of the elastomeric ring 124 and less than the outer diameter D5 of the elastomeric ring D4. In the assembled position, the tapered surface 182 and the projection 184 engage and indent into the first annular face 162 of the elastomeric ring 124. In the exemplary embodiment, all of, or the majority of, the engagement between the retaining structure 180 and the first annular face 162 occurs in the inner half of the first annular face 162. In other words, the first annular face 162 has a thickness T and the majority of engagement between the retaining portion 180 and the first annular face 162 occurs in the inner half of the thickness T (i.e., closer to the inner diameter D4 of the elastomeric ring than to the outer diameter D5).

In operation, as the cot wheel 112 rotates, it pulls the fibers 102 around the perimeter of the cot wheel 112 and in between the cot wheel and the cutter wheel 114. The blades 116 on the cutter wheel 114 contact the circumferential surface 110 of the cot wheel 112 such that the fibers 102 therebetween are severed. Typical rotational speed of the cot wheel 112 may vary with different configurations of the cutting assembly 100. In some embodiments, for example, the rotational speed of the cot wheel 112 is such that the linear speed of the fibers 102 is about 20 m/sec or greater. As rotational speed increases, centrifugal forces act against the clamping forces that hold the elastomeric ring 124 onto the inner hub 122. The retaining device 126 holds the elastomeric ring 124 in place relative to the inner hub 122 to ensure that, at higher speeds, the centrifugal forces do not overcome the clamping forces resulting in the elastomeric ring 124 slipping relative to the inner hub 122.

The engagement of the first and second retaining rings 200, 202 with the elastomeric ring 124 prevents the ring from expanding outward. In addition, the tapered surface 182 provides a wedging effect that increases the clamping force between the elastomeric ring 124 and the inner hub 122, particularly at the edges of the elastomeric ring adjacent the first and second annular faces 162, 166.

Figure 10:
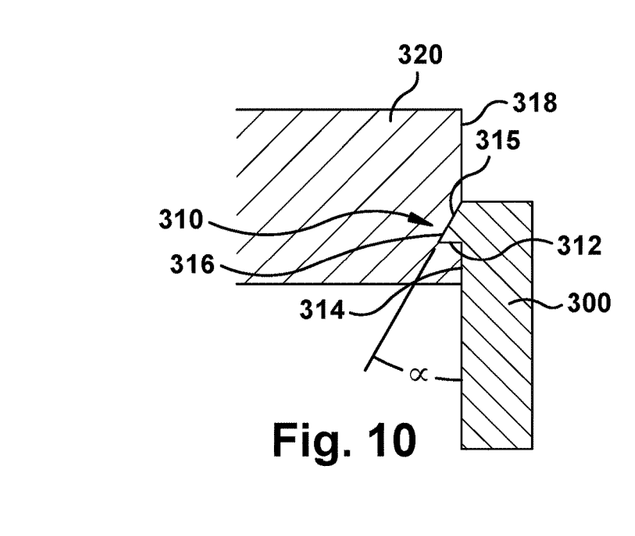
FIG. 10 is a partial cross-section view of an exemplary embodiment of a retaining member of the assembly of FIG. 1.

FIG. 10 illustrates an exemplary embodiment of a first retaining member 300. The first retaining member 300 is substantially similar to the first retaining member 200 except that the first retaining member 300 includes a retaining structure 310 that is configured differently than the retaining structure 180 of the first retaining member 200. In particular, the retaining structure 310 of the first retaining member 300 includes a shoulder 312 projecting outward from an annular face 314 of the first retaining member 300. A tapered surface 315 extends outward from the annular face 314 and intersects with the shoulder 312 to form a projection or barb 316. The projection or barb 316 may indent into an annular face 318 of an elastomeric ring 320, which is substantially similar to the elastomeric ring 124 of FIGS. 5-6. The tapered surface 315 extends at an angle α from the annular face 314. In one embodiment, the angle α is in the range of 5 degrees to 20 degrees. In one embodiment, the angle α is 10 degrees or about 10 degrees. In other embodiment, the angle α may be greater than 20 degrees and less than 5 degrees.

In operation, the retaining structure 310 functions similar to the retaining structure 180 of the first retaining member 200 by engaging the elastomeric ring 320 to retain the elastomeric ring in place, such that the centrifugal forces, at higher speeds, do not overcome the clamping forces.

Figure 11:
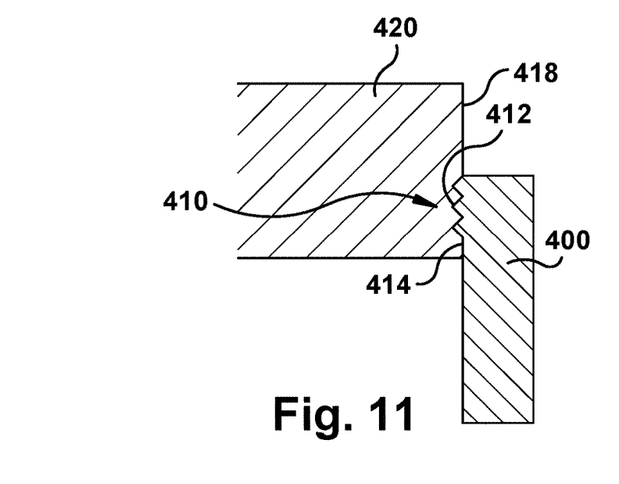
FIG. 11 is a partial cross-section view of an exemplary embodiment of a retaining member of the assembly of FIG. 1.

FIG. 11 illustrates an exemplary embodiment of a first retaining member 400. The first retaining member 400 is substantially similar to the first retaining member 200 except that the first retaining member 400 includes a retaining structure 410 that is configured differently than the retaining structure 180 of the first retaining member 200. In particular, the retaining structure 410 of the first retaining member 400 includes one or more teeth or threads 412 projecting outward from an annular face 414 of the first retaining member 400. The one or more teeth or threads 412 may indent into an annular face 418 of an elastomeric ring 420, which is substantially similar to the elastomeric ring 124 of FIGS. 5-6. The one or more teeth or threads 412 may be configured in a variety of ways. For example, the number of teeth, the shape and height of the teeth, and the frequency of the teeth may vary in different embodiments. In operation, the retaining structure 410 functions similar to the retaining structure 180 of the first retaining member 200 by engaging the elastomeric ring 420 to retain the elastomeric ring in place, such that the centrifugal forces, at higher speeds, do not overcome the clamping forces.

Figure 12:
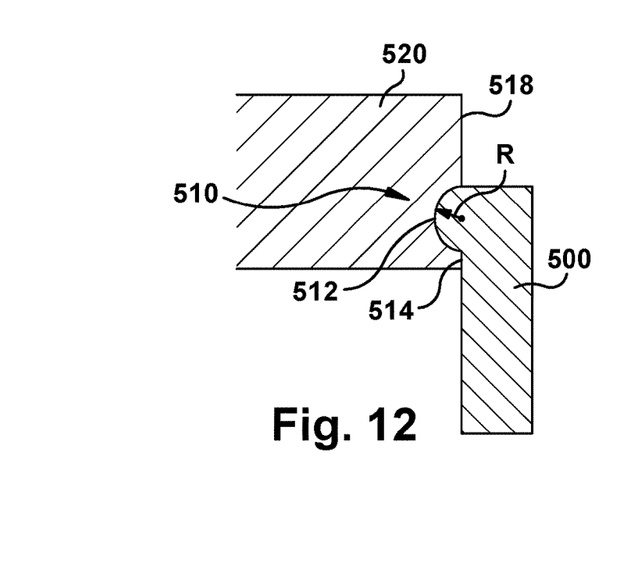
FIG. 12 is a partial cross-section view of an exemplary embodiment of a retaining member of the assembly of FIG. 1.

FIG. 12 illustrates an exemplary embodiment of a first retaining member 500. The first retaining member 500 is substantially similar to the first retaining member 200 except that the first retaining member 500 includes a retaining structure 510 that is configured differently than the retaining structure 180 of the first retaining member 200. In particular, the retaining structure 510 of the first retaining member 500 includes a rounded projection 512 projecting outward from an annular face 514 of the first retaining member 500. The rounded projection 512 may indent into an annular face 518 of an elastomeric ring 520, which is substantially similar to the elastomeric ring 124 of FIGS. 5-6. The rounded projection 512 may be configured in a variety of ways. For example, the height and shape of the rounded projection 512 may vary in different embodiments. In the illustrated embodiment, the projection 512 is semi-circular with a constant radius R. In other embodiments, however, the projection 512 may not have a constant radius. In operation, the retaining structure 510 functions similar to the retaining structure 180 of the first retaining member 200 by engaging the elastomeric ring 520 to retain the elastomeric ring in place, such that the centrifugal forces, at higher speeds, do not overcome the clamping forces.

Figure 13:
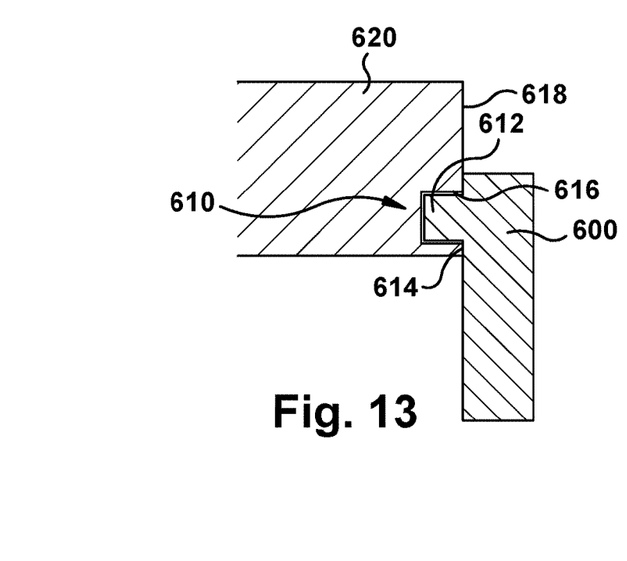
FIG. 13 is a partial cross-section view of an exemplary embodiment of a retaining member of the assembly of FIG. 1.

FIG. 13 illustrates an exemplary embodiment of a first retaining member 600. The first retaining member 600 is substantially similar to the first retaining member 200 except that the first retaining member 600 includes a retaining structure 610 that is configured differently than the retaining structure 180 of the first retaining member 200. In particular, the retaining structure 610 of the first retaining member 600 includes a projection 612 projecting outward from an annular face 614 of the first retaining member 600. The projection 612 is received within a groove or recess 616 in the annular face 618 of an elastomeric ring 620, which is substantially similar to the elastomeric ring 124 of FIGS. 5-6, but for the groove or recess 616. The projection 612 and groove or recess 616 may be configured in a variety of ways. For example, the height and shape of the projection 612 and groove or recess 616 may vary in different embodiments. In the illustrated embodiment, the projection 612 is a rectangular ridge extending continuously around the annular face 614 of the first retaining member 600 and is received in the groove or recess 616 which is also rectangular and extends continuously around the annular face 618. In other embodiments, however, the projection 612 and the groove 616 may be other than rectangular and may be discontinuous. In operation, the retaining structure 610 functions similar to the retaining structure 180 of the first retaining member 200 by engaging the elastomeric ring 620 to retain the elastomeric ring in place, such that the centrifugal forces, at higher speeds, do not overcome the clamping forces.

The above description of specific embodiments has been given by way of example. From the disclosure given, those skilled in the art will not only understand the general inventive concepts and their attendant advantages, but will also find apparent various changes and modifications to the structures and concepts disclosed. It is sought, therefore, to cover all such changes and modifications as fall within the spirit and scope of the general inventive concepts, as defined herein and by the appended claims, and equivalents thereof.

We claim:

1. An assembly for chopping glass fibers, the assembly comprising:
   a cutter wheel having a plurality of radially extending blades; and
   a cot wheel adjacent the cutter wheel, the cot wheel comprising:
   an inner hub;
   an elastomeric ring mounted onto the inner hub for rotation therewith, the elastomeric ring having a planar, annular first face and a planar, annular second face opposite the first face; and
   a retaining device including a first retaining member fixably attached to the inner hub, the first retaining member including an annular inner face, an annular outer face opposite the inner face, and an outer circumferential surface extending between the inner face and the outer face, wherein the inner face includes a tapered surface tapering outward from a planar portion of the inner face toward the outer circumferential surface such that a projection is formed at an intersection of the inner face and the outer circumferential surface;
   wherein the projection and the tapered surface indent into the planar, annular face of the elastomeric ring and the tapered surface wedges at least a portion of the elastomeric ring toward the inner hub to resist separation of the elastomeric ring from the hub during rotation of the cot wheel.

2. The assembly of claim 1, wherein the elastomeric ring is pressed onto the inner hub.

3. The assembly of claim 1, wherein the elastomeric ring comprises polyurethane.

4. The assembly of claim 1, wherein the retaining device further includes a second retaining member, and wherein the elastomeric ring is sandwiched between the first retaining member and the second retaining member.

5. The assembly of claim 4, wherein the second retaining member includes an annular second inner face, an annular second outer face opposite the second inner face, and a second outer circumferential surface extending between the second inner face and the second outer face, wherein the second inner face includes a second tapered surface tapering outward from a second planar portion of the second inner face toward the second outer circumferential surface such that a second projection is formed at an intersection between the second inner face and the outer circumferential surface; wherein the second projection and second tapered surface indent into the planar, annular second face of the elastomeric ring and the second tapered surface wedges at least a portion of the elastomeric ring toward the inner hub.

6. The assembly of claim 5, wherein the elastomeric ring has a thickness T and the majority of engagement between the first retaining member and the planar, annular first face occurs in an inner half of the thickness T.

7. The assembly of claim 4, wherein the first retaining member is an annular ring with an outer diameter that is greater than the inner diameter of the elastomeric ring and less than the outer diameter of the elastomeric ring.

8. The assembly of claim 4, wherein the projection extends continuously around the inner face of the first retaining member.

9. A method of cutting glass fibers, the method comprising:
  bringing continuous glass fibers into engagement with a circumferential surface of a first rotatable member that includes an elastomeric ring mounted onto a cylindrical inner hub for rotation with the inner hub;
  rotating the first rotatable member to bring the glass fibers into contact with one or more cutter blades;
  cutting the glass fibers into discrete segments with the one or more blades; and
  mechanically holding the elastomeric ring in place relative to the inner hub by wedging at least a portion of the elastomeric ring toward the inner hub with a tapered surface on an inner face of a retaining member fixably attached to the inner hub, wherein the tapered surface tapers outward from a planar portion of the inner face toward an outer circumferential surface of the retaining member, and indenting into a planar, annular face of the elastomeric ring with the tapered surface and a projection on the retaining member to resist separation of the elastomeric ring from the hub during rotation of the first rotatable member, wherein the projection is located at an intersection of the inner face and the outer circumferential surface.

10. The method of claim 9 wherein the retaining member is an annular ring with an outer diameter that is greater than the inner diameter of the elastomeric ring and less than the outer diameter of the elastomeric ring.

* * * * *